Patented Feb. 5, 1952

2,584,368

UNITED STATES PATENT OFFICE 2,584,368

PROCESS OF PREPARING 3-PHTHALIMIDO-METHYL BENZANTHRONE

David I. Randall and Saul R. Buc, Easton, Pa., assignors to General Aniline & Film Corporation, New York, N. Y., a corporation of Delaware No Drawing. Application November 3, 1950, Serial No. 194,012

4 Claims. (Cl. 260—326)

This invention relates to 3-phthalimidomethyl benzanthrones and particularly to a process of preparing the same.

It is known that polycyclic ketones and quinones react with formaldehyde in 96% sulfuric acid to yield condensation products which are not uniform in structure and dyeing properties.

We have found that benzanthrones in which the 3-position is unoccupied, i. e., free of a substituent group, react in the presence of concentrated sulfuric acid, with N-hydroxymethylphthalimides to yield 3-phthalimidomethyl benzanthrones. These compounds are not only valuable as dyestuff intermediates, colorants and pigments, but on base splitting to the phthalamic acid yield dyestuff intermediates which are also valuable as colorants in dyeing nylon, wool, and as pigments in ink bases.

It is an object of the present invention to provide a method of preparing 3-phthalimidomethyl benzanthrones.

Other objects and advantages will become apparent from the following description.

The above and other objects are accomplished by condensing a benzanthrone in which the 3-position is unoccupied with an N-hydroxymethylphthalimide in the presence of concentrated sulfuric acid. The group or groups present in the benzanthrone ring system is immaterial so long as the 3-position is unoccupied and so long as the positions ortho to the 3-position are not occupied by a meta-directing substituent group, e. g., nitro, carboxy, sulfo, etc.

In practicing the invention a gram mol of a benzanthrone in which the 3-position is unoccupied is dissolved in 96% sulfuric acid at a temperature ranging from 10°–80° C. and to the solution is added one molecular equivalent (in 6% molar excess) of an N-hydroxymethylphthalimide. The mixture is allowed to stand preferably with stirring for a period of time ranging from 12 to 20 hours at a temperature between 25°–40° C., preferably at a temperature ranging between 25°–30° C. After the condensation reaction is complete, the reaction mixture is then poured over ice, washed several times with water, and dried. The precipitated product may be used as such as a dyestuff intermediate or subjected to hydrolysis to yield phthalamic acid and aminomethyl benzanthrones.

The benzanthrones in which the 3-position is unoccupied may be substituted in any one of the other positions by an ortho-para-directing substituent, such as a halogen, e. g., chlorine, or bromine, an alkyl, e. g., methyl, ethyl, propyl, etc., acrylic acid or thioglycollic acid group, and the like. Such groups may appear in one or more or all of the positions other than the 3-position. Meta-directing substituent groups, such as aldehyde, nitro, carboxyl, or sulfonic acid group can occupy any position in the benzanthrone nucleus provided that this 3-position remains unoccupied and said substituent does not occupy a position ortho to the said unoccupied position.

As representative of benzanthrones in which the 3-position is unoccupied and falling within the foregoing description, reference may be made to the following:

Benzanthrone
2-benzanthroneacrylic acid
9-chlorobenzanthrone
9-methylbenzanthrone
2-methylbenzanthrone.

The N - hydroxymethylphthalimides which may be employed are N-hydroxymethylphthalimide itself, a substituted N-hydroxymethylphthalimide wherein one or more substituents may be present in the 3- to 6-positions of the benzene nucleus. Thus, there are included such representative N - hydroxymethylphthalimides as:

N-hydroxymethyl-3-methylphthalimide
N-hydroxymethyl-4-methylphthalimide
N-hydroxymethyl-4,5-dibromophthalimide
N-hydroxymethyl-4-chlorophthalimide
N-hydroxymethyl-3,4-dichlorophthalimide
N-hydroxymethyl-3-nitrophthalimide
N-hydroxymethyl-4-nitrophthalimide
N-hydroxymethyl-5-aminophthalimide
N-hydroxymethyl-6-aminophthalimide.

The N-hydroxymethylphthalimides are readily prepared by boiling formalin solution with a phthalimide.

Instead of employing an N-hydroxymethylphthalimide in the condensation reaction, molecular equivalents of a phthalimide and formaldehyde or a formaldehyde producing compound, such as paraformaldehyde, may be used.

Our invention will be more fully described in conjunction with the following specific examples. It should be understood, however, that the examples are given by way of illustration only and the invention is not to be limited by the details set forth herein.

Example I

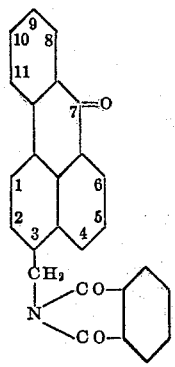

Twenty-three parts of benzanthrone were dissolved in 257 parts of 96% sulfuric acid. When solution was completed, 18.7 parts of N-hydroxymethylphthalimide were stirred in (the temperature rising from 31° C. to 37° C.), and the solution allowed to stand for 15 hours. The condensation product was worked up by pouring into ice water, filtering and washing the filtrate free of acid, and drying at 80° C. Thirty-nine parts of a dried light-yellow product (100% of theory) were obtained which melted at a temperature ranging between 245°-270° C. After crystallizing twice from o-dichlorobenzene, the melting point was raised to 294°-297° C. without decomposition.

The nitrogen analysis showed the following results:

N calculated _____ 3.61
N found _____ 3.71

Caustic fusion in alcohol failed to give a violanthrone dye which is characteristic of benzanthrones with free 3- and 4-positions. From this caustic fusion, it is evident that the 3-position is occupied by the phthalimidomethyl group.

Example II

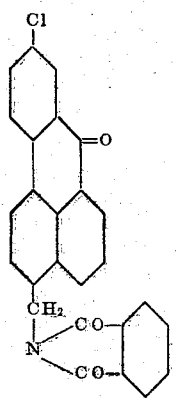

Two hundred sixty-five parts of 9-chlorobenzanthrone were dissolved in 2000 parts of 96% sulfuric acid. To this solution were added 187 parts of N-hydroxymethylphthalimide. The reaction mixture was kept at 60°-65° C. for 2 hours with stirring. The condensation product was obtained quantitatively on working up as in Example I.

Example III

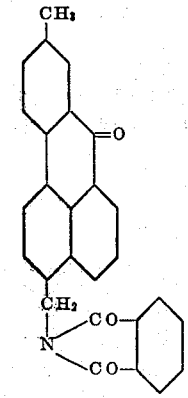

Example II was repeated with the exception that 265 parts of 9-chlorobenzanthrone were replaced by 245 parts of 9-methylbenzanthrone. The yield was practically quantitative.

This application is a continuation-in-part of our application Serial No. 60,396, filed November 16, 1948, now United States Patent 2,536,984, dated January 2, 1951.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:
1. The process of preparing an N-phthaloylaminomethyl derivative of benzanthrone which comprises condensing in the presence of concentrated sulfuric acid one mol of an N-hydroxymethylphthalimide with one mol of a benzanthrone, such benzanthrone being free of hydroxy groups and having the 3-position thereof unsubstituted and having no meta-directing substituent in ortho-position to the carbon atom in said 3-position.
2. The process of preparing an N-phthaloylaminomethyl derivative of benzanthrone which comprises condensing in the presence of concentrated sulfuric acid 1 mol of N-hydroxymethylphthalimide with 1 mol of benzanthrone.
3. The process of preparing an N-phthaloylaminomethyl derivative of benzanthrone which comprises condensing in the presence of concentrated sulfuric acid 1 mol of N-hydroxymethylphthalimide with 1 mol of 9-chlorobenzanthrone.
4. The process of preparing an N-phthaloylaminomethyl derivative of benzanthrone which comprises condensing in the presence of concentrated sulfuric acid 1 mol of N-hydroxymethylphthalimide with 1 mol of 9-methylbenzanthrone.

DAVID I. RANDALL.
SAUL R. BUC.

REFERENCES CITED

The following references are of record in the file of this patent:

UNITED STATES PATENTS

| Number | Name | Date |
| --- | --- | --- |
| 2,536,984 | Randall et al. | Jan. 2, 1951 |